(12) United States Patent
MacGregor

(10) Patent No.: US 6,845,604 B1
(45) Date of Patent: Jan. 25, 2005

(54) RAKE STRIPPER

(76) Inventor: Dale G. MacGregor, 5125 W. Oregon Rd., Lapeer, MI (US) 48446-8059

(*) Notice: Subject to any disclaimer, the term of this patent is extended or adjusted under 35 U.S.C. 154(b) by 0 days.

(21) Appl. No.: 10/668,859

(22) Filed: Sep. 23, 2003

(51) Int. Cl.⁷ ................................................ A01D 7/10
(52) U.S. Cl. .................................................. 56/400.08
(58) Field of Search ........................ 56/400.09, 400.1, 56/400.04, 400.08, 400.12; 294/50.6–50.9; 172/371, 378

(56) References Cited

U.S. PATENT DOCUMENTS

| | | |
|---|---|---|
| 695,139 A | 3/1902 | Benson |
| 1,144,703 A | 6/1915 | Goodsell |
| 1,254,041 A | 1/1918 | Hoel |
| 1,264,750 A * | 4/1918 | Bacho .................... 56/400.08 |
| 1,450,877 A | 4/1923 | Wahlen |
| 1,981,488 A | 11/1934 | Wikander et al. |
| 2,183,278 A | 12/1939 | Kelly |
| 2,222,566 A * | 11/1940 | MacGregor .............. 56/400.08 |
| 2,489,047 A | 11/1949 | Pabst et al. |
| 2,572,247 A * | 10/1951 | Conway ................... 56/400.08 |
| 2,642,712 A * | 6/1953 | Huff ........................ 56/400.08 |
| 4,165,598 A | 8/1979 | Kutsi |
| 5,414,983 A | 5/1995 | Counard et al. |

* cited by examiner

Primary Examiner—Robert E Pezzuto
(74) Attorney, Agent, or Firm—Dale J. Ream

(57) ABSTRACT

A rake stripper includes a cleaning member pivotally coupled to a rake handle for movement between a retracted position and an extended position. The cleaning member includes a pair of cleaning elements positioned relatively close to the tines of the rake for cleaning debris therefrom as the cleaning member is moved between retracted and extended positions. The cleaning member includes a bracket for telescopically permitting adjustment of the width of the cleaning member. A biasing member couples the cleaning member to the rake handle, permitting movement between retracted and extended positions. The biasing member biases the cleaning member toward the retracted position. The cleaning member scrapes debris from the tines when the cleaning member is forced from the retracted position toward the extended position. Removal of the deployment force permits the biasing member to return the cleaning member to the retracted position.

11 Claims, 7 Drawing Sheets

RAKE STRIPPER

BACKGROUND OF THE INVENTION

1. Field of the Invention

The present invention relates to a debris stripping device configured for attachment to a rake for stripping debris from the rake head. More particularly, the present invention is directed toward a rake stripper capable of being adjusted for use with rakes and rake heads of varying sizes.

2. Discussion of the Prior Art

Prior art rake attachments for stripping debris from a rake have been known for quite some time. For example, U.S. Pat. No. 695,139 to Benson (the Benson patent) was issued in 1902 and is directed to such a rake attachment. The Benson patent discloses the use of an ejector formed from a metallic wire loop that engages the front and back sides of the rake tines so that as the ejector is moved from a retracted position to an extended position, debris is removed from the tines.

More recently, U.S. Pat. No. 4,165,598 to Kutsi (the Kutsi patent) discloses a rake attachment for stripping debris from a rake. The attachment employs a plate fitted about the tines so that as it is moved from a retracted position to an extended position, the plate urges debris from the tines.

Such prior art devices, however, are constructed to be of a fixed size and do not provide a means for ready adjustment so that the same attachment may be used on rakes of varying sizes. There is a need for an adjustable rake stripping attachment having a relatively simple design for ease of use and construction. The present invention is directed toward such a device.

BRIEF SUMMARY OF THE INVENTION

A new and improved rake stripper for cleaning debris from a rake broadly comprises a cleaning member pivotally coupled with the handle of a conventional rake for movement between a first, retracted position and a second, extended position. The cleaning member includes a pair of cleaning elements positioned relatively close to at least a portion of the tines of the rake so that as the cleaning member is moved between the retracted and extended positions, the debris is cleaned from the rake tines.

The cleaning elements each present a proximal end and a distal end. The distal ends of the elements define the width of the cleaning member. The cleaning member further includes a bracket as an adjustment means for adjusting the width of the cleaning member. The bracket presents a longitudinal axis and is used for selectively positioning the distal ends of the cleaning elements along a line generally parallel to the longitudinal axis of the bracket for adjustment of the width of the cleaning member. As a result, the rake stripper is capable of being fitted to rakes of varying sizes. In addition, a rake stripper constructed in accordance with the present invention having its cleaning member set for use on a relatively large rake may be removed from that large rake, and the cleaning member adjusted to a smaller width for use on a smaller rake, further increasing the utility of the inventive stripper.

A biasing member is used to couple the cleaning member to the rake handle, permitting movement between the retracted and extended positions. In addition, the biasing member is used as a biasing means for biasing the cleaning member toward the retracted position. The rake stripper is deployed by forcing the cleaning member from the retracted position toward the extended position, so that the cleaning elements scrape debris from the tines of the rake. Such deployment may be actuated by rotating the rake 180° about its longitudinal axis and contacting the exposed biasing member with the ground thereby forcing the cleaning member to move from the retracted position to the extended position. Removal of the deployment force permits the biasing member to return the cleaning member to the retracted position for later use.

BRIEF DESCRIPTION OF THE DRAWINGS

FIG. 4b is an isolated fragmentary view of the stripper on an enlarged scale taken along the line as depicted in FIG. 4a;

DETAILED DESCRIPTION OF THE PREFERRED EMBODIMENT

Figure 1:
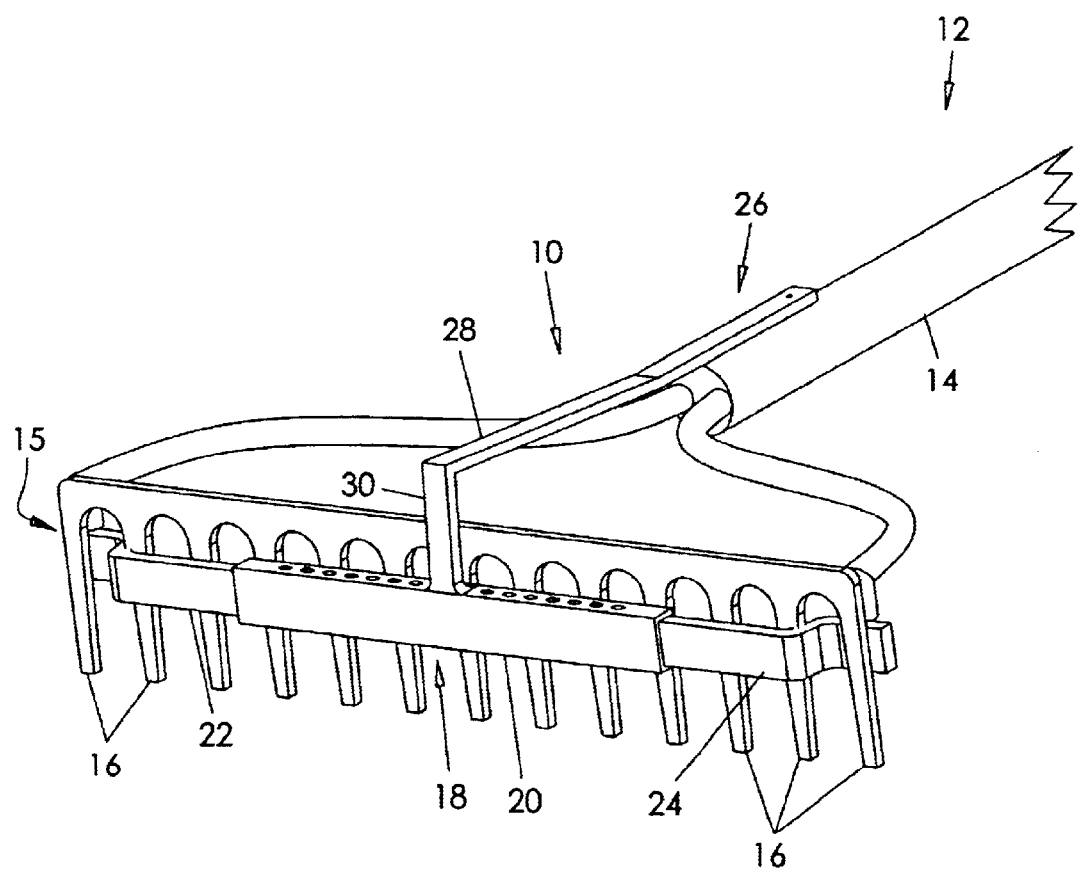
FIG. 1 is a perspective view of a rake stripper constructed in accordance with a preferred embodiment of the present invention coupled with a rake.

Referring now to the drawings, FIG. 1 depicts a rake stripper 10 constructed in accordance with a preferred embodiment of the present invention attached to a rake 12 having a handle 14 and a rake head 15 with a plurality of tines 16. The stripper 10 includes a cleaning member 18 having an open-ended, hollow bracket 20 and a pair of cleaning element bars 22, 24 received in the ends of the bracket 20. The cleaning bars 22, 24 are constructed from generally rigid material.

Figure 2A:
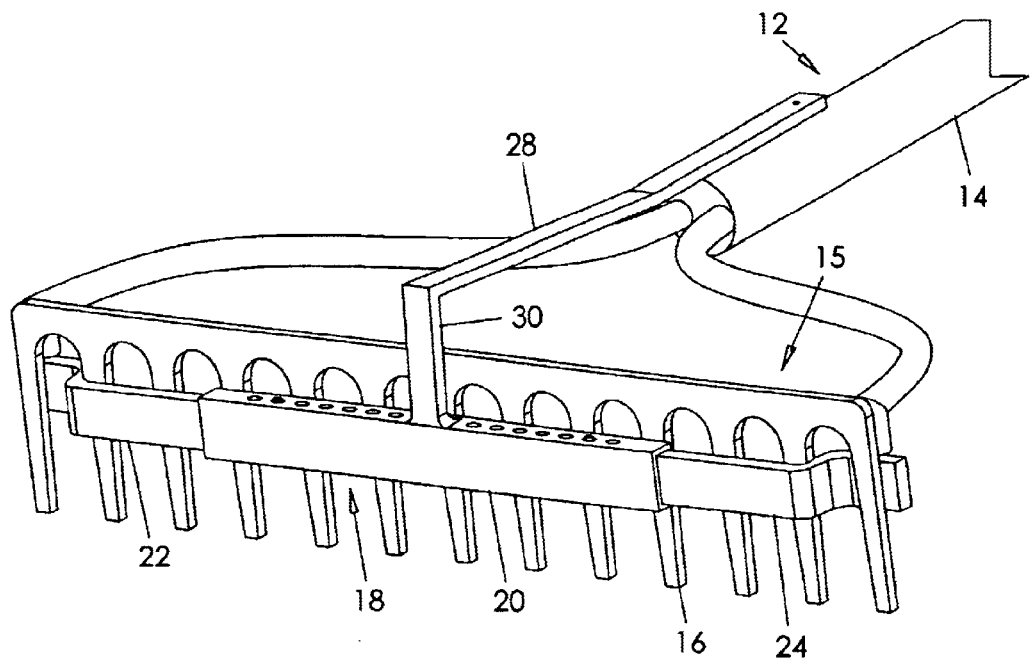
FIG. 2a is a perspective view of the stripper of FIG. 1 showing the cleaning member in the retracted position.
Figure 2B:
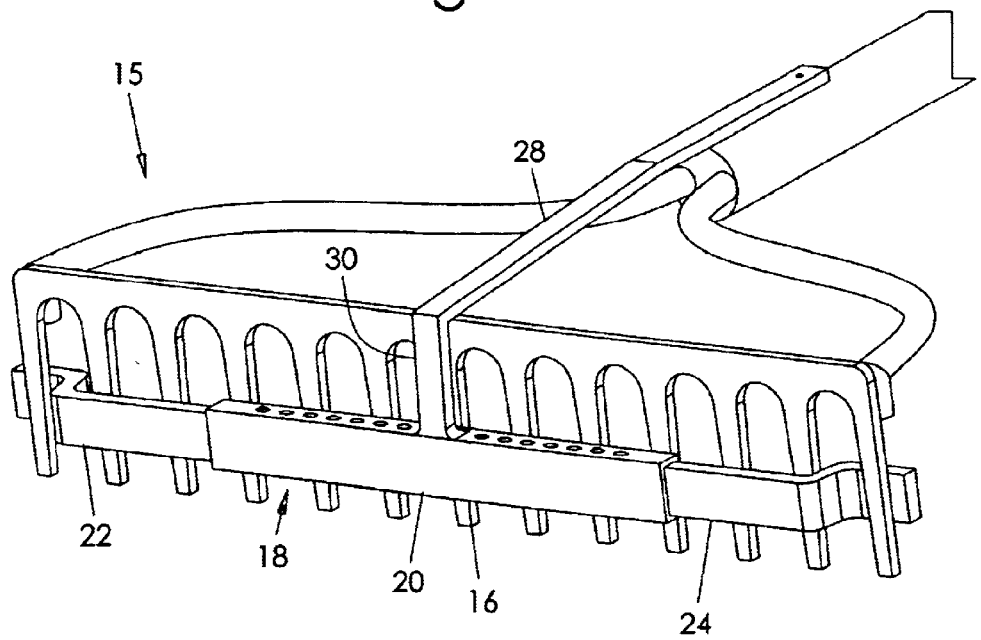
FIG. 2b is a perspective view of the stripper of FIG. 1 showing the cleaning member in the extended position.

The cleaning member 18 is attached to the rake handle 14 by a biasing member 26. The biasing member 26 includes a cantilevered-spring 28 and an integral bracket support 30 for supporting the bracket 20 thereby positioning the cleaning member 18 in close proximity to the tines 16 of the rake 12. The spring 28 is preferably constructed from spring steel having memory, or other suitable material providing appropriate strength and memory. The spring 28 permits movement of the cleaning member 18 between a retracted position, as shown in FIG. 2a, and an extended position, as shown in FIG. 2b. In addition, the spring 28 biases the cleaning member 18 toward the retracted position.

The support 30 includes a generally T-shaped end (not shown) for supporting the bracket 20. The T-shaped end of the support 30 permits relatively easy assembly of the stripper 10 while causing the cleaning member 18 to move between the retracted and extended positions as the spring 28 is deflected and released. The bracket 20 may be fixed to the support 30 by screws, rivets, nuts and bolts or other conventional fastening devices known in the art. It will be appreciated that by providing a T-shaped end, the support 30 presents more surface area and a greater linear length for installation of the fastening devices, thereby strengthening the rake stripper 10.

Figure 3A:
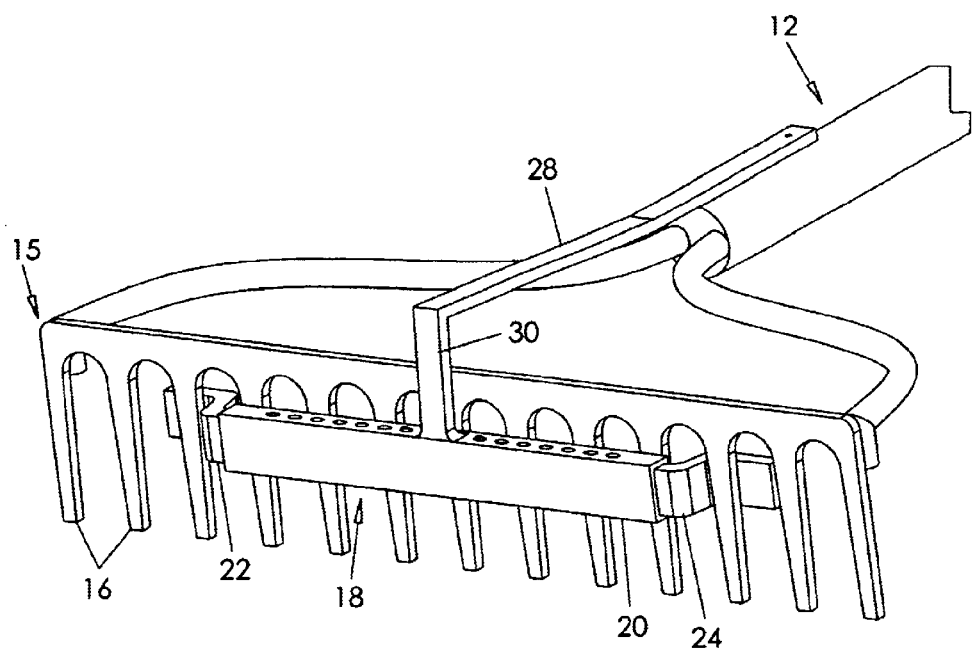
FIG. 3a is a perspective view of the stripper of FIG. 1 wherein the cleaning member is adjusted to a relatively narrow width.

The cleaning member 18 is adjustable between a relatively narrow width and a relatively wider width. FIG. 3a depicts the cleaning member 18 in a narrow condition wherein the cleaning bars 22, 24 are fully inserted into the bracket 20. Such a condition may be desired when the stripper 10 is attached to a rake 12 having a relatively narrow head 15, or to yield more stability to the stripper 10 for concentrated cleaning of the center section of the head 15.

Figure 3B:
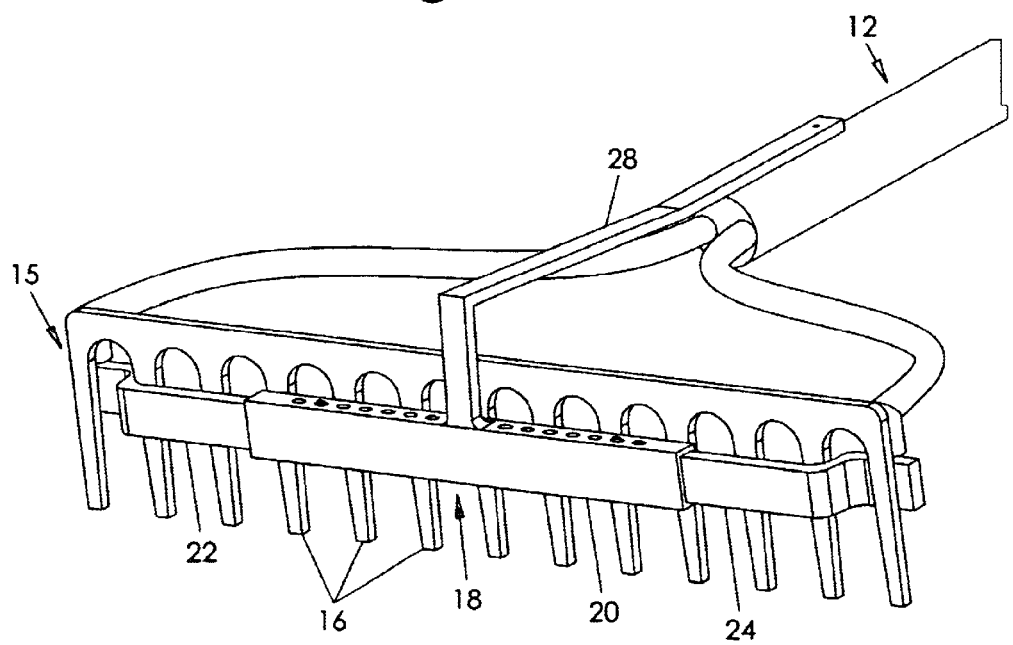
FIG. 3b is a perspective view of the stripper of FIG. 1 wherein the cleaning member is adjusted to a relatively wide width.

FIG. 3b shows the cleaning member 18 adjusted so that the cleaning bars 22, 24 span the entire width of the rake head 15. Such a condition may be desired when the rake head 15 is relatively wide, or when the debris stripping capabilities of the stripper 10 are desired over the span of the rake head 15.

Figure 4A:
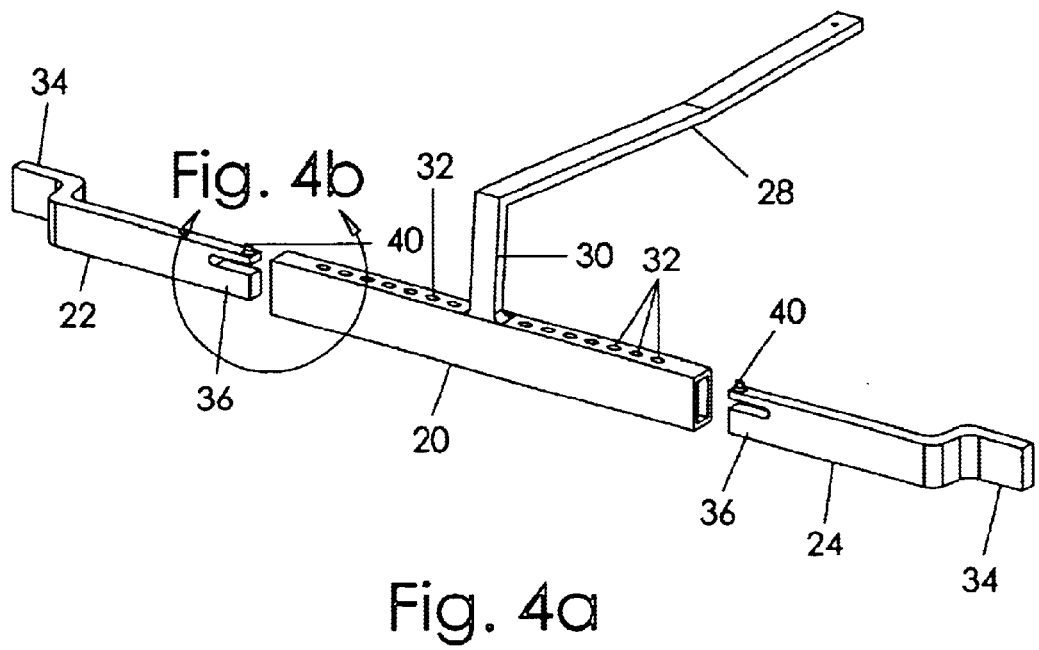
FIG. 4a is an exploded view of the stripper of FIG. 1.
Figure 4B:
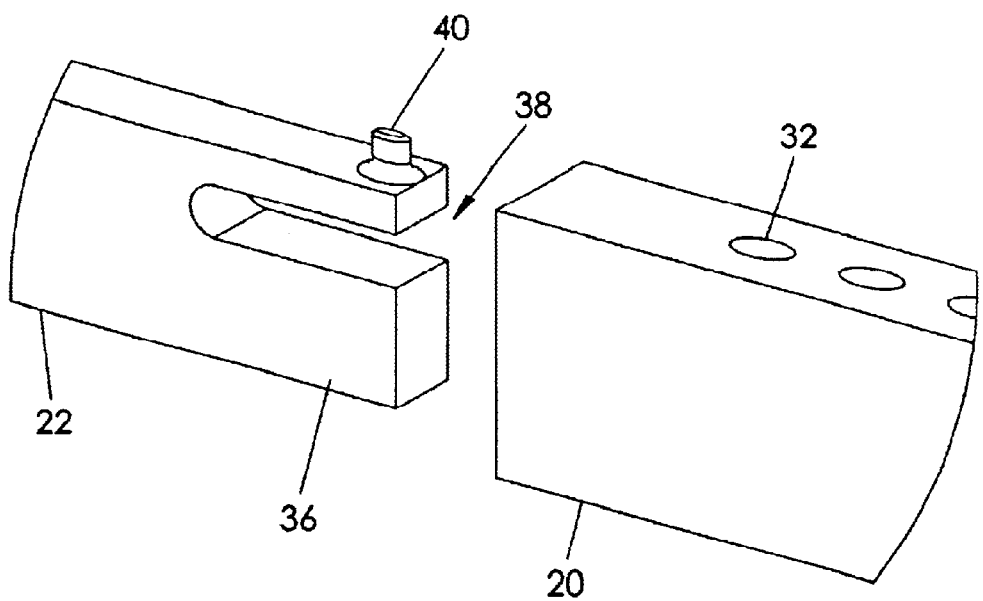

As revealed in FIGS. 4a and 4b, the bracket 20 is hollow and presents a generally rectangular-shaped cross section. A plurality of adjustment holes 32 extend through the upper face of the bracket 20.

The cleaning bars 22, 24 each present a distal end 34 and a proximal end 36. The distal end 34 is generally s-shaped so that in use, the end 34 engages the front side of a portion of the tines 16 and the back side of another portion of the tines 16. The proximal ends 36 of the bars 22, 24 are received for telescopic movement within the interior of the bracket 20 so that the bars 22, 24 may be moved between a narrow position, shown in FIG. 3a, and a wide position, shown in FIG. 3b.

The proximal ends 36 have a groove 38 defined therein for engaging the support 30 when in the narrow position. A retaining button 40 is also positioned in a recess located on each of the proximal ends 36 of the bars 22, 24. The buttons 40 are configured for locking the bars 22, 24 in a desired position. The grooves 38 provide flexibility at the proximal ends 36 of the bars 22, 24 when the buttons 40 are depressed such that the bars may be slidably adjusted. The buttons 40 are conventional and are biased toward the extended position shown in FIG. 4b. The buttons 40 have an outer circumference slightly smaller than the inner circumference of the adjustment holes 32. As a result, when the bars 22, 24 are inserted into the bracket 20, the buttons 40 are configured to reside within a desired adjustment hole 32 locking the bars in position. Depressing the appropriate button 40 permits the bars 22, 24 to be moved so that the button 40 may be aligned with another hole 32, thereby adjusting the width of the cleaning member 18.

When in the narrow position, as shown in FIG. 3a, the grooves 38 engage the T-shaped end of the support 30. This construction yields a relatively rigid connection between the support 30 and bracket 20, while keeping the relative size of the bracket 20 when compared with the cleaning bars 22, 24 and permitting a larger range of telescopic motion in the bracket 20 than if the bars 22, 24 did not have the grooves 38.

In use, the stripper 10 is attached to the handle 14 of a rake 12 so that the cleaning member 18 is adjacent to the rake head 15. A fastening device is preferably used to secure the biasing member 26 to the handle 14. Prior to attachment, the cleaning bars 22, 24 are adjusted to an appropriate length so that the cleaning member 18 is of a similar length to that of the rake head 15. Once attached, the distal ends 34 of the cleaning bars 22, 24 are adjacent to the outer-most tines 16 of the rake head 15. Should the rake 12 become worn or broken and in need of replacement, it will be appreciated that the rake stripper 10 may be easily removed from the rake 12 for use on another rake. Furthermore, the length of the cleaning member 18 of the stripper 10 may be adjusted so that the stripper 10 may be used on a replacement rake having different size than that of the original rake 12, greatly increasing the utility of the stripper 10.

Figure 7:
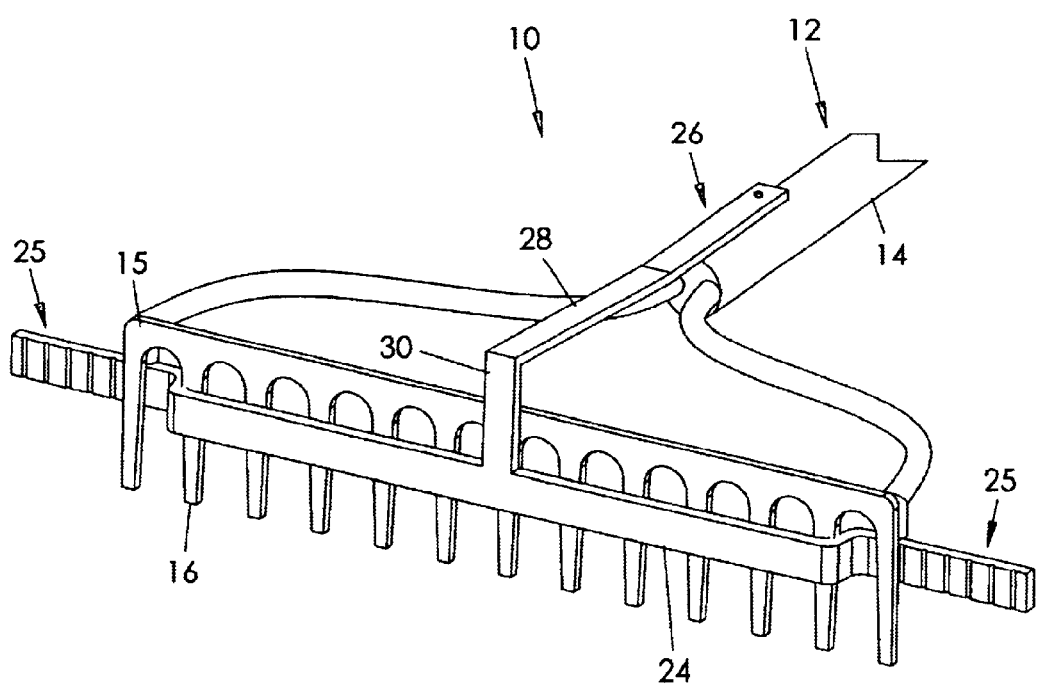
FIG. 7 is a perspective view of a rake stripper constructed in accordance with another alternative embodiment of the present invention.

In an alternative form the bracket and cleaning bars of the cleaning member may be incorporated in a unitary structure wherein the outer ends of the cleaning member utilize breakaway tabs (25) to yield adjustability (FIG. 7). While such a design would only permit adjustment of the length of the cleaning member downwardly, it would provide a degree of adjustability and relatively lower costs due to fewer parts. The breakaway tabs of such an alternative cleaning member would be broken away at the time of installation so that the cleaning member would be of a suitable size for the rake to which the stripper is attached.

Figure 5:
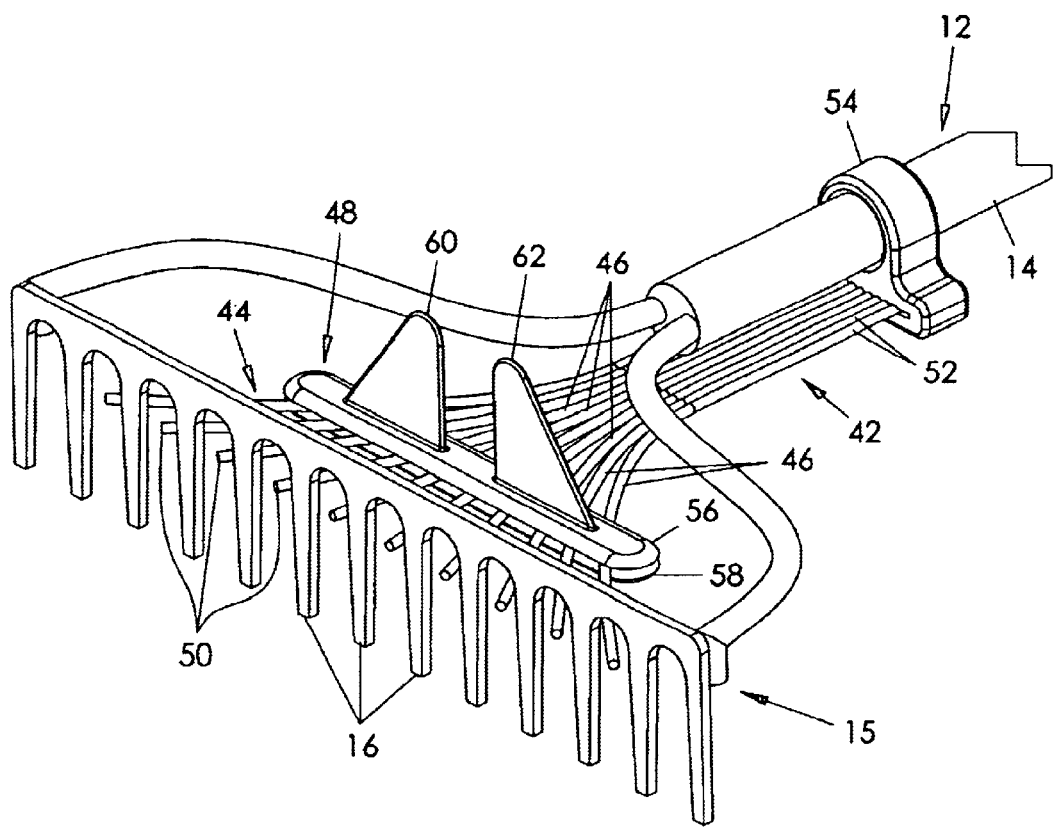
FIG. 5 is a perspective view of the rake stripper constructed in accordance with an alternative embodiment of the present invention; an FIG. 6 is a perspective view of the rake stripper constructed in accordance with another alternative embodiment of the present invention.

Turning now to FIG. 5, an alternative rake stripper 42 is depicted attached to the rake 12. The stripper 42 broadly includes a cleaning member 44 having a plurality of cleaning element wires 46 and a bracket 48. The wires 46 each present a distal end 50 and a proximal end 52. The proximal ends 52 are received in a clamp 54 configured for attachment to the rake handle 14. It will be appreciated that the clamp 54 and bracket 48 keep the wires 46 in a generally co-planar configuration. The wires 46 are of varying lengths with the shortest wires 46 positioned in the center portion of the stripper 42 and the longer wires 46 positioned toward the outer edges of the stripper 42 permitting the wires 46 to be fanned while keeping the distal ends 50 positioned generally along a common line and also aligned with the tines 16.

The bracket 48 includes opposed, upper and lower halves 56, 58 that are fastened together by conventional means for clamping the wires 46 adjacent to the distal ends 50 thereof. Deflection flanges 60, 62 are mounted on the upper half 56 of the bracket 48.

The bracket 48 and distal ends 50 of the wires 46 cooperatively define the cleaning member 44, the width of which is defined by the two distal ends 50 that lie along the outer edges of the array of wires 46. By unfastening the halves 56, 58 of the bracket 48, the bracket 48 may be moved back and forth along the wires 46 permitting increased or decreased fanning of the wires 46. As a result, the bracket 48 provides an adjustment means for adjusting the width of the cleaning member 44. While movement of the bracket 48 along the wires 46 will not keep the distal ends 50 in perfect alignment due to their geometry, the ends 50 will stay in general alignment while providing various options with regard to the width of the cleaning member 44.

The proximal ends 52 of the wires 46 are constructed from material that is relatively flexible, with memory. Therefore the proximal ends 52 permit movement of the cleaning member 44 between a retracted position and an extended position, and provide a means for biasing the cleaning member 44 toward the retracted position.

In use, the rake 12 is rotated 180°, and the deflection flanges 60, 62 are pressed against the ground, thereby moving the cleaning member 44 from the retracted position toward the extended position, scraping debris from the tines 16 of the rake 12. Removal of the deflection force allows the cleaning member 44 to be brought back to the retracted position.

Figure 6:
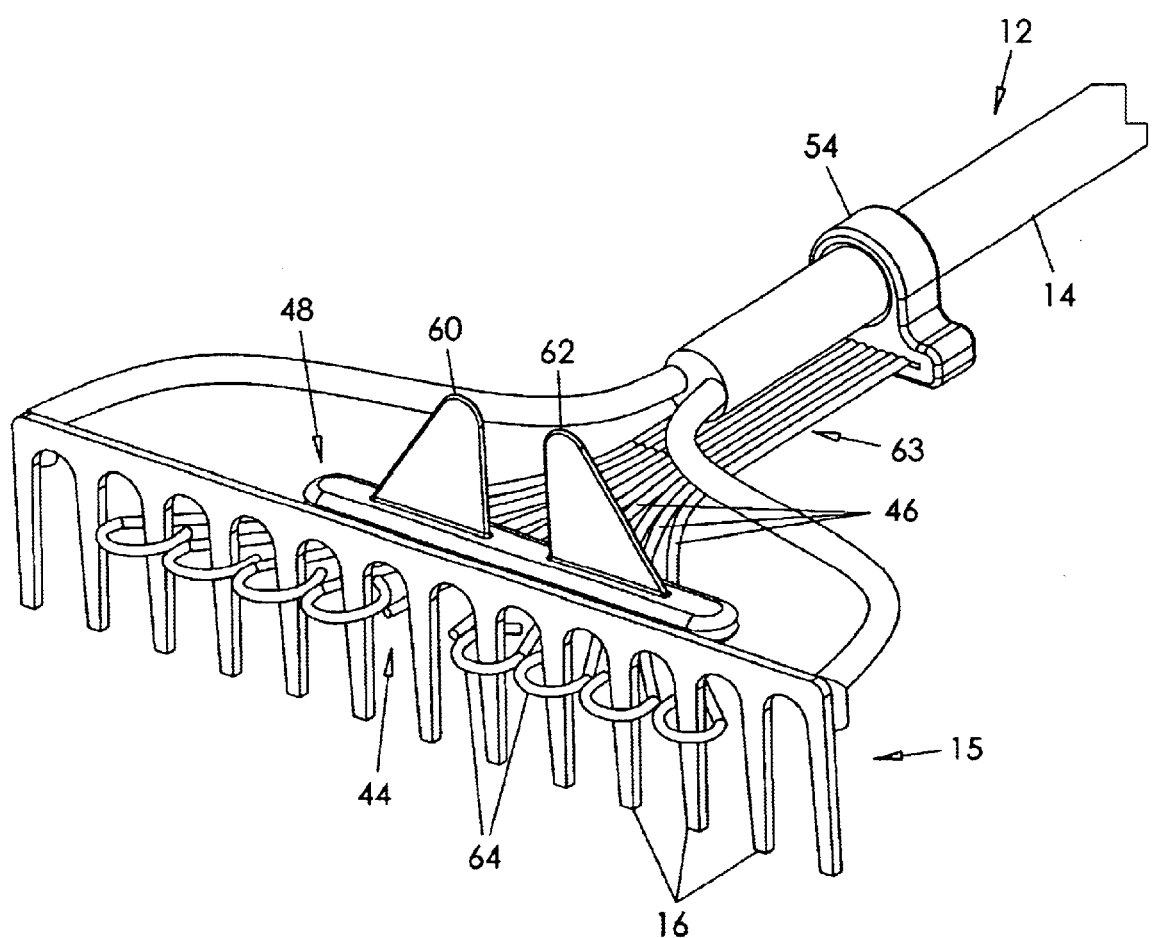

FIG. 6 shows a rake stripper 63 constructed in accordance with another alternative embodiment of the present invention. The distal ends 50 of the wires 46 of the stripper 63 define loops 64 that loop about the tines 16 when the stripper 42 is attached to the rake 12. It will be appreciated that the alternative stripper 63 functions in much the same way as the stripper 42. By incorporating the loops 64, the stripper 63 provides relatively more surface area for stripping debris from the tines 16 than the stripper 42 of FIG. 5.

Although the invention has been described in the above preferred embodiment with reference to the drawing figures, it is understood that substitutions may be made and equivalents employed herein with departing from the scope of the invention as set forth in the following claims.

Having thus described the invention, what is claimed as new and desired to be secured by Letters Patent is as follows:

1. A rake stripper for cleaning debris from a rake having a handle and a plurality of tines, the stripper comprising:
   a cleaning member presenting a width, moveable between a first, retracted position and a second, extended position, the cleaning member comprising:
      a pair of cleaning elements, each element having a distal end wherein the distal ends define the width of the cleaning member, and
      an adjustment means for adjusting the width of the member, the adjustment means including a bracket coupled with the cleaning elements and presenting a longitudinal axis for selective positioning of the distal ends along a line generally parallel to the longitudinal axis of the bracket;
   a biasing means for biasing the cleaning member toward the retracted position; and
   wherein the bracket and cleaning elements of the cleaning member are formed from a unitary structure, and the distal ends of the cleaning elements include a plurality of break away tabs as an adjustment means for adjusting the width of the cleaning member.

2. The rake stripper as set forth in claim 1, wherein the bracket defines a hollow interior and includes opposed, open ends of the bracket.

3. The rake stripper as set forth in claim 2, wherein one of the cleaning elements is telescopically received in each of the ends.

4. The rake Stripper as set forth in claim 3, wherein the bracket presents an upper face and a plurality of adjustment holes defined through the upper face of the bracket and in communication with the bracket interior.

5. The rake stripper as set forth in claim 4, wherein each of the cleaning elements presents a recess and includes a locking button positioned in the recess.

6. The rake stripper as set forth in claim 5, wherein each of the buttons defines an outer circumference, and the adjustment holes each define an inner circumference that is greater than the outer circumference of the buttons.

7. The rake as set forth in claim 1, wherein the biasing means includes a biasing member having a unitary cantilevered spring and a support coupled with the bracket.

8. The rake stripper as set forth in claim 1, wherein the bracket includes a pair of bracket halves clamped about the cleaning elements adjacent to the distal ends thereof.

9. The rake stripper as set forth in claim 8, wherein the cleaning elements are constructed from generally flexible material having a memory and present proximal ends.

10. The rake stripper as set forth in claim 9, wherein the biasing means for biasing the cleaning member toward the retracted position includes a rake handle clamp in which the proximal ends of the cleaning elements are received.

11. A rake stripper for cleaning debris from a rake having a handle and a plurality of tines, the stripper comprising:
   a bracket presenting a longitudinal axis, and defining a hollow interior space and opposed, open ends;
   a biasing member for permitting movement of the bracket between a first, retracted position and a second extended position, and for biasing the bracket toward the retracted position, the biasing member including an integral cantilevered spring and support coupled with the bracket;
   a pair of cleaning bars each having proximal and distal ends, the proximal ends of the bars being telescopically received within the open each ends of the bracket for selective movement of the bars along the longitudinal axis of the bracket between a narrow position and a wide position; and
   wherein the bracket and the pair of cleaning bars are formed from a unitary structure, and the distal ends of the pair of cleaning bars including a plurality of break away tabs as an adjustment means for adjusting the width of the pair of cleaning bars.

* * * * *